(12) United States Patent
Gunther (10) Patent No.: US 6,817,517 B2
(45) Date of Patent: Nov. 16, 2004

(54) DISTRIBUTION BASED POSTAGE TRACKING SYSTEM AND METHOD

(75) Inventor: William G. Gunther, Guilford, CT (US)

(73) Assignee: George Schmitt & Company, Inc., Guilford, CT (US)

(*) Notice: Subject to any disclaimer, the term of this patent is extended or adjusted under 35 U.S.C. 154(b) by 197 days.

(21) Appl. No.: 10/280,872

(22) Filed: Oct. 25, 2002

(65) Prior Publication Data

US 2003/0080182 A1 May 1, 2003

Related U.S. Application Data

(60) Provisional application No. 60/335,475, filed on Nov. 15, 2001, and provisional application No. 60/346,805, filed on Oct. 25, 2001.

(51) Int. Cl.[7] .............................................. G06F 17/00
(52) U.S. Cl. ..................... 235/375; 235/385; 705/22; 705/28; 700/224; 283/71
(58) Field of Search ............................... 235/375, 385, 235/384, 494, 487; 705/22, 28, 29, 1, 60, 61, 62, 401, 404; 700/224, 225; 283/71; 40/299.01; 382/101, 102, 103

(56) References Cited

U.S. PATENT DOCUMENTS

| | | | | |
|---|---|---|---|---|
| 5,038,283 A | * | 8/1991 | Caveney ..................... | 705/28 |
| 5,064,222 A | * | 11/1991 | Legault ...................... | 283/71 |
| 5,267,754 A | * | 12/1993 | Kaule ......................... | 283/71 |
| 5,554,842 A | * | 9/1996 | Connell et al. ............ | 235/491 |
| 5,848,401 A | * | 12/1998 | Goldberg et al. .......... | 705/408 |
| 5,900,610 A | * | 5/1999 | Kelly, Jr. ................... | 235/385 |
| 5,917,925 A | | 6/1999 | Moore | |
| 5,923,406 A | * | 7/1999 | Brasington et al. .......... | 355/40 |
| 5,943,432 A | * | 8/1999 | Gilmore et al. ............ | 382/101 |
| 6,005,945 A | * | 12/1999 | Whitehouse ................ | 380/51 |
| 6,130,613 A | | 10/2000 | Eberhardt et al. | |
| 6,208,910 B1 | * | 3/2001 | Michael et al. ............ | 700/225 |
| 6,385,504 B1 | * | 5/2002 | Pintsov et al. ............. | 705/60 |
| 6,415,983 B1 | * | 7/2002 | Ulvr et al. .................. | 235/487 |
| 6,427,021 B1 | * | 7/2002 | Fischer et al. ............. | 382/101 |
| 6,510,992 B2 | * | 1/2003 | Wells et al. ................ | 235/385 |
| 2002/0040353 A1 | * | 4/2002 | Brown et al. ............... | 705/401 |
| 2002/0056988 A1 | * | 5/2002 | Patton ......................... | 283/71 |
| 2002/0073039 A1 | * | 6/2002 | Ogg et al. ................... | 705/60 |
| 2002/0091545 A1 | * | 7/2002 | Heiden et al. .............. | 705/1 |
| 2003/0037008 A1 | * | 2/2003 | Raju et al. .................. | 705/60 |
| 2003/0088426 A1 | * | 5/2003 | Benson et al. .............. | 705/1 |
| 2004/0070194 A1 | * | 4/2004 | Janetzke et al. ............ | 283/71 |
| 2004/0108386 A1 | * | 6/2004 | Rasti .......................... | 235/494 |

FOREIGN PATENT DOCUMENTS

FR              2 788 505 A1 *  7/2000

* cited by examiner

Primary Examiner—Jared J. Fureman
(74) Attorney, Agent, or Firm—St. Onge Steward Johnston & Reens LLC (57) ABSTRACT

A distribution unit is formed from a plurality of postage items, each of the postage items having a tracking number printed thereon. The distribution unit includes a machine readable tracking identifier indicative of the tracking number printed on the postage items which form the distribution unit. A machine reader is provided for reading the machine readable tracking identifier as the distribution unit is distributed and for determining the tracking number therefrom. A computer system receives the tracking number from the machine reader and stores in a memory the tracking number along with a time and date the distribution unit was distributed.

33 Claims, 5 Drawing Sheets

DISTRIBUTION BASED POSTAGE TRACKING SYSTEM AND METHOD

RELATED APPLICATIONS

This patent application claims the benefit of, under Title 35, United States Code, Section 119(e), U.S. Provisional Patent Application No. 60/346,805, filed Oct. 25, 2001 and U.S. Provisional Patent Application No. 60/335,475, filed Nov. 15, 2001.

FIELD OF THE INVENTION

The present invention relates generally to a system for tracking postage, and more particularly to a system for tracking postage through the various distribution channels of such postage.

BACKGROUND OF THE INVENTION

The mailing of anthrax-tainted letters in the United States mail stream by bio-terrorists in late 2001 and the plethora of hoaxes which followed have underscored the need for the traceability of the mail. Knowing where and when a letter was mailed from its cancellation provides only limited clues as to the homebase of the sender, and gives no evidence as to whether the sender traveled some distance from his or her home to divert investigation from his or her immediate locale. The news media has speculated, for instance, that the same individual may have been responsible for mailing letters containing anthrax in late 2001 from St. Petersburg, Fla. and Trenton, N.J. However, one can only speculate as to whether the sender of these letters is from either of these places, or whether he or she traveled possibly great distances to mail the tainted letters from these locations.

It is presumed that criminal activity using the mail may take many forms, and the more information that investigators of such criminal activity has, the more effective they will be in narrowing the focus of the investigation. In the case of bio-terrorism, it would seem likely that envelopes would have been carefully prepared in a terrorist's laboratory, necessitating the purchase of preprinted envelopes or stamps, quite possibly near where he or she lived. Knowing where and approximately when these supplies were purchased may provide important clues as to the whereabouts of such terrorists.

Several systems have been proposed which generally touch upon the idea of tracking postage. U.S. Pat. No. 5,917,925, for instance, discloses an authenticating, tracking, and anti-counterfeiting indicia system which can track postal fee collection of mailpieces. The system includes a control computer, one or more host computers which cooperate with the control computer, a marking system, and a field reader system, which are all compatible and can be physically linked via data transmission links. An identifiable mark is placed on the mailpieces, which enables subsequent inspection. The mailpieces can be field inspected with a field reader to verify proper fee payment, to determine the authenticity of the mark, or to track the distribution of the mailpieces.

This system, however, suffers from a number of disadvantages. One such disadvantage is that the system itself must be used to generate and print the marking on the mailpieces (i.e., the system operates in this manner similar to a postage meter). The system however, is not useable with postage (e.g., stamps and preprinted envelopes) which are purchased from or through the U.S. Postal Service. (The '925 patent itself states at column 1, line 42 that the system disclosed therein is intended to "enable a user to avoid using postage stamps and instead encode mailpieces with authenticity data . . . "). While such postage meter type systems may be efficiently used by medium to large sized companies, requiring their use by small business owners and individuals rather than allowing such businesses and persons to use postage stamps or preprinted envelopes, is undesirable.

U.S. Pat. No. 6,130,613 discloses a radio frequency postage stamp which includes a substrate with first and second surfaces, the first surface being printed with indicia indicating a postage value. An antenna is formed on the second surface and a radio frequency identification circuit chip is secured to the second surface and coupled to the antenna. A layer of adhesive is also disposed on the second surface. The radio frequency identification circuit chip has stored thereon a preprogrammed postage value. However, the postage stamp disclosed in the '613 patent suffers from a number of disadvantages. One of such disadvantages is that the postage stamp disclosed thereon does not employ any type of system for tracking the distribution thereof. Another disadvantage is that incorporating a radio frequency identification circuit chip and an associated antenna into postage stamps would greatly increase the complexity of manufacture and therefore the costs associated therewith.

What is desired, therefore, is a distribution based system for tracking postage which can be used to determine the location and approximate time of purchase of such postage, which is relatively simple to implement, which does not significantly increase the cost of manufacturing such postage, and which can be implemented with the current system of using stamps and preprinted envelopes.

SUMMARY OF THE INVENTION

Accordingly, it is an object of the present invention to provide a distribution based system for tracking postage which can be used to determine the location and approximate time of purchase of such postage.

Another object of the present invention is to provide a distribution based system for tracking postage having the above characteristics and which is relatively simple to implement.

A further object of the present invention is to provide a distribution based system for tracking postage having the above characteristics and which does not significantly increase the cost of manufacturing such postage.

Still another object of the present invention is to provide a distribution based system for tracking postage having the above characteristics and which can be implemented with the current system of using stamps and preprinted envelopes.

These and other objects of the present invention are achieved by provision of a distribution based system for tracking postage. A distribution unit is formed from a plurality of postage items, each of the postage items having a tracking number printed thereon. The distribution unit includes a machine readable tracking identifier indicative of the tracking number printed on the postage items which form the distribution unit. A machine reader is provided for reading the machine readable tracking identifier as the distribution unit is distributed and for determining the tracking number therefrom. A computer system receives the tracking number from the machine reader and stores in a memory the tracking number along with a time and date the distribution unit was distributed.

Preferably, the machine readable tracking identifier comprises a bar code, and the memory comprises a database. The system may be used to track various postage items, such as postage stamps and/or preprinted envelopes. The tracking number may be printed on the postage items overtly with visible ink or covertly with invisible ink with an ultra violet tracer. The distribution unit may comprise a sales unit, such as a coil or booklet of postage stamps, or may comprise a shipping unit, such as a carton of postage items.

In one embodiment, the computer system comprises a local computer located at a point of sale of sales unit, a central computer, and a central database accessible by the central computer. The local computer receives the tracking number from the machine reader and transmits to the central computer via a communications link the tracking number along with the time and date the sales unit was sold. The central computer stores in the database the tracking number along with the time and date the sales unit was sold. The local computer may optionally receive purchaser information about a purchaser of the sales unit, and transmit to the central computer the purchaser information with the tracking number and the time and date the sales unit was sold. In this case, the central computer stores in the database the purchaser information along with the tracking number and the time and date the sales unit was sold.

In another embodiment, the computer system comprises a local computer located at a shipping location from which a shipping unit is shipped and a database accessible by the local computer. The local computer receives information about a destination of the shipping unit, receives the tracking number from the machine reader and stores in the database the tracking number along with the time and date the shipping unit was shipped and the destination of the shipping unit.

The invention and its particular features and advantages will become more apparent from the following detailed description considered with reference to the accompanying drawings.

DETAILED DESCRIPTION OF AN EMBODIMENT OF THE INVENTION

Figure 1:
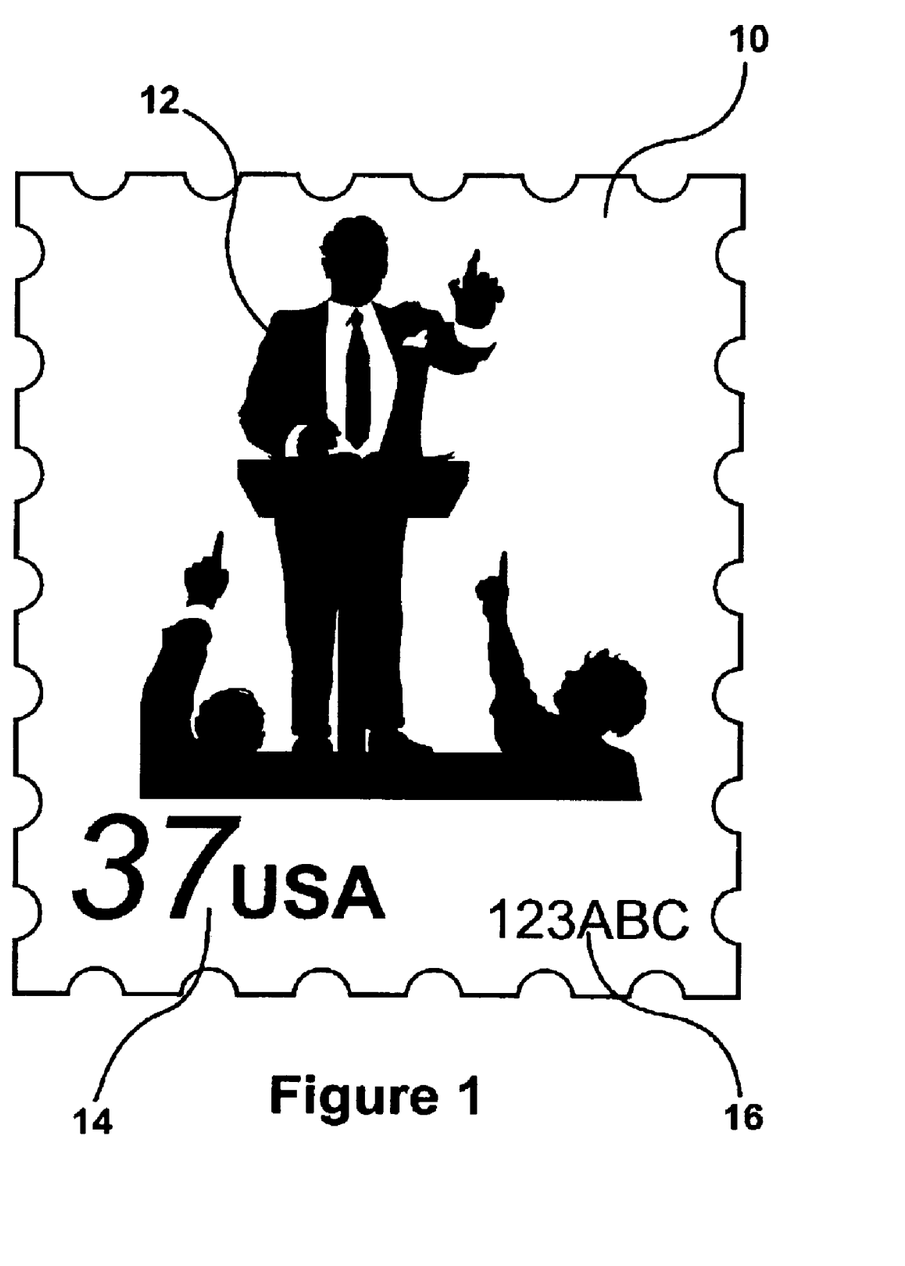
FIG. 1 is a front plan view of a postage stamp for use with a distribution based system for tracking postage in accordance with the present invention.

Referring first to FIG. 1, a postage stamp 10 for use with a distribution based tracking system in accordance with the present invention is shown. Postage stamp 10 is similar in configuration to traditional postage stamps, and may for example, have a decorative picture or design 12 and/or a monetary FIG. 14 printed thereon. However, unlike traditional postage stamps, postage stamp 10 also has printed thereon a covert or overt tracking number 16. If tracking number 16 is overt (i.e., readily visible with the naked eye), tracking number 16 could be printed using conventional printing techniques, such as by printing with variable printing device such as an ink jet printing head. If tracking number 16 is covert (i.e., not readily visible with the naked eye), tracking number 16 could be imprinted using invisible ink with an ultra violet tracer, such as would be visible under a black light.

While it is theoretically possible for each postage stamp 10 to have its own unique tracking number 16, such would be cost prohibitive and impractical. This is true because if each of the approximately 40 billion postage stamps sold each year had a unique identity, an unmanageable database would be required to be maintained. Problems would also arise with inputting into the system the unique tracking number for each and every stamp sold, particularly when they are sold in large numbers. Therefore, the present invention contemplates that groups of postage stamps 10 within a distribution unit be individually marked as part of that distribution unit, and that groups of stamps rather than individual stamps be tracked.

Figure 2:
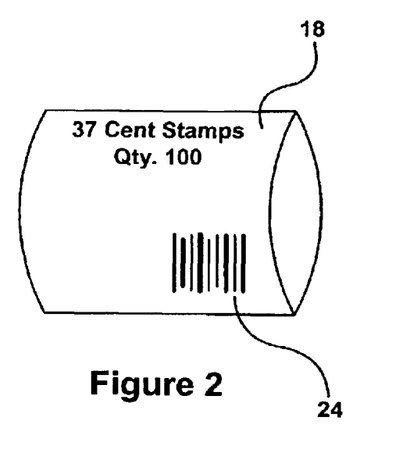
FIG. 2 is a front isometric view of a roll of postage stamps for use with a distribution based system for tracking postage in accordance with the present invention.
Figure 3:
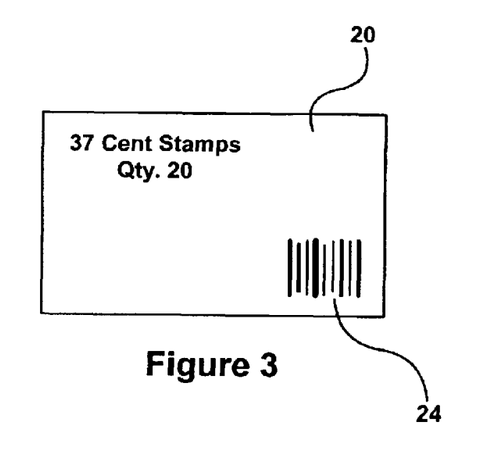
FIG. 3 is a front plan view of a booklet of postage stamps for use with a distribution based system for tracking postage in accordance with the present invention.
Figure 4:
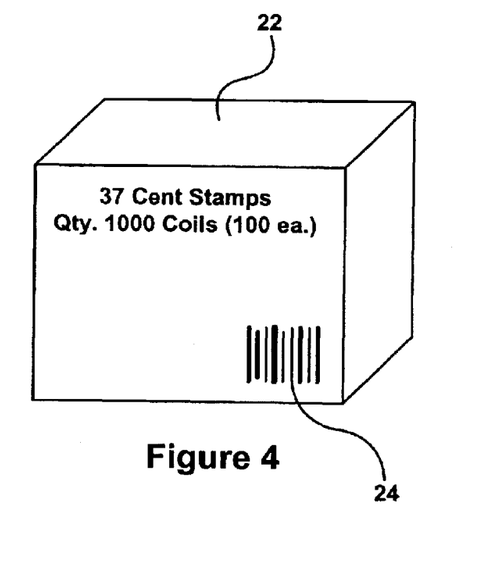
FIG. 4 is a front isometric view of a carton of postage stamps for use with a distribution based system for tracking postage in accordance with the present invention.

Referring now to FIGS. 2–4, exemplary embodiments of ways postage stamps 10 may be grouped are shown. FIGS. 2 and 3 show postage stamps 10 being grouped according to sales units. More specifically, FIG. 2 shows a coil 18 of stamps. For purposes of illustration and not limitation, coil 18 of stamps may include 100 postage stamps 10. FIG. 3 shows a booklet 20 of stamps, which may include, for example, 20 postage stamps 10. Other sales units are also possible. For example, stamps are sometimes distributed in panes or sets, and it should be understood that the present invention may be easily adapted to the distribution of stamps in such sales units. FIG. 4 shows postage stamps 10 being grouped according to shipping units. More specifically, FIG. 4 shows a carton 22 of stamps, which for purposes of illustration and not limitation may contain 1000 coils of stamps, each containing for example 100 stamps. Together sales units and shipping units are referred to as "distribution units."

As shown in FIGS. 2–4, each of the distribution units 18,20,22 has a machine readable identification 24 associated therewith. Machine readable identification 24 may comprise for example, a bar code printed on an exposed surface of distribution units 18,20,22, a radio frequency tag, or any other type of identifier which can be read automatically. Machine readable identification 24 corresponds to the tracking number 16 printed on each of the stamps that makes up each particular distribution unit 18,20,22. For example, the outside wrapper of coil 18, the salvage area of booklet 20 or the outer surface of carton 22 may printed using a visible, scannable barcode, which corresponds to the identifying number of that particular distribution unit 18,20,22. Each postage stamp 10 in this distribution unit is printed with tracking number 16 in the final stages of its manufacture in a covert or overt manner as described above, which tracking number 16 corresponds to the identifying number of the particular distribution unit 18,20,22 of which it forms a part.

Figure 5:
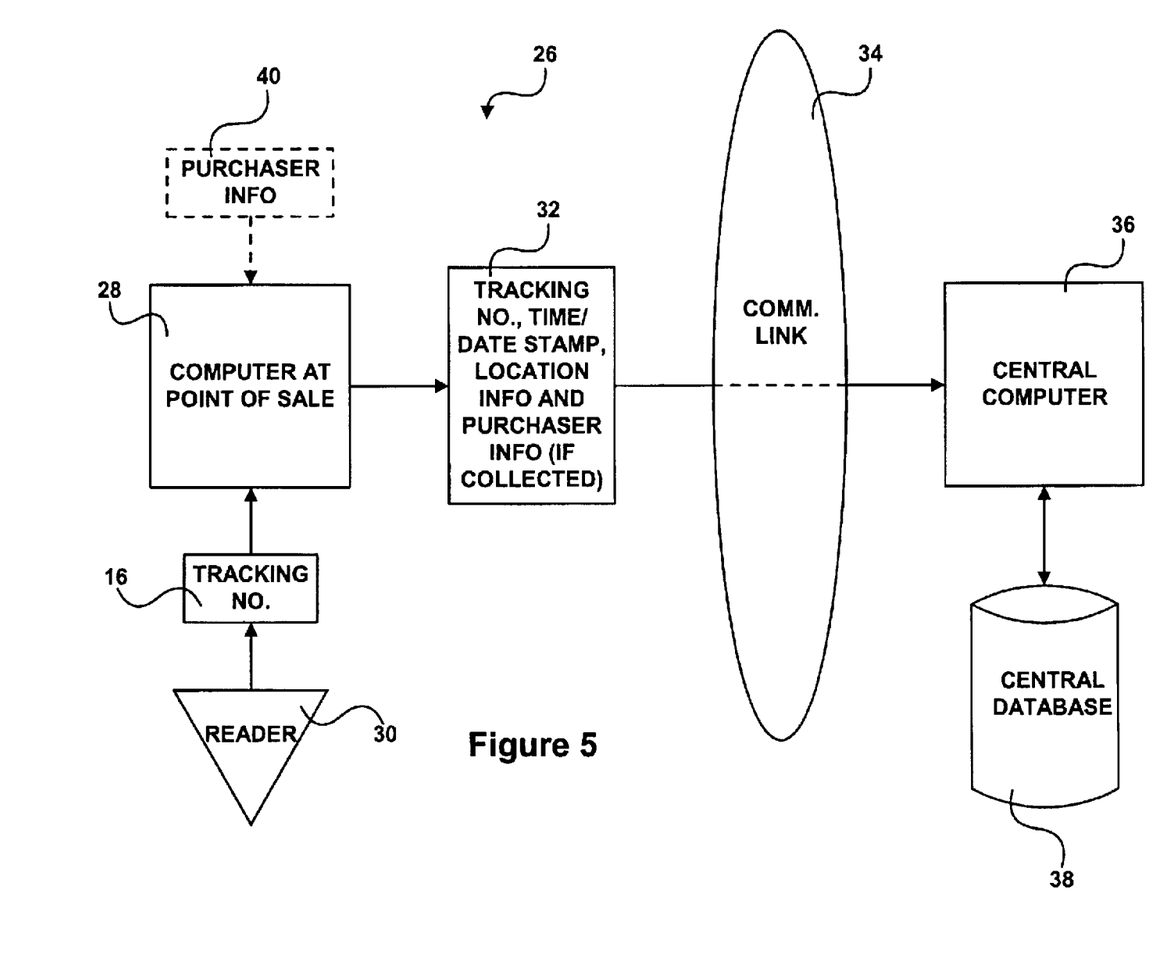
FIG. 5 is a schematic view illustrating one embodiment of a distribution based system for tracking postage in accordance with the present invention.

Referring now to FIG. 5, a first embodiment of a distribution based system 26 for tracking postage in accordance with the present invention is shown. As will be understood from the below description, although system 26 may be used with any type of distribution unit 18,20,22, it is particularly well suited for use with sales units, such as coils 18 and booklets 20 of stamps. Under system 26, a computer 28 is provided at each Post Office branch or any other retail point of sale of postage stamps 10. Connected to computer 28 is a machine reader 30 for reading machine readable identification 24 on each sales unit (i.e., coil 18 or booklet 20 of stamps) as they are sold. It is possible that the machine readable identification 24 could be embedded in unused fields in the barcode that the United States Postal Service (USPS) is currently using for its point of sale item recognition. As each sales unit 18,20 is sold, the tracking number 16 of the postage stamps 10 making up sales unit 18,20 is read by machine reader 30 and communicated to computer 28. The read tracking number 16 is then supplemented with information concerning the time and date the sales unit 18,20 was sold and with information concerning the point of sale location where the sales unit 18,20 was sold, and this combined information 32 is transmitted via a communication link 34 to a central computer which stores this information on a central database 36.

As should be understood, each Post Office branch and any other retail point of sale of postage stamps 10 would be in communication with central computer 36. Thus, using system 26, information concerning the time, date and location of the sale of substantially all postage stamps 10 is maintained in a centralized location. Each stamp now has a unique identity as one of a relatively small group of stamps forming a sales unit, and can be tracked all the way back through it's use, travel and history. Using the same number for all stamps on each sales unit reduces computer storage requirements by up to 100-fold (in the case of coils 18 having 100 stamps). Should one of postage stamps 10 be used for criminal activity, it is determinable within minutes where and exactly when that stamp was sold.

Additionally, system 26 may optionally (indicated by dashed lines) collect purchaser information 40 about the purchaser of postage stamps 10. For example, the postage stamps 10 might only be for sale by credit or debit card, which requires a signature by the purchaser. Alternately, customers may be asked to sign a receipt for the postage stamps 10. This information may be stored locally at the point of sale or may be transmitted to central computer 36 along with the information 32 concerning tracking number 16, the time and date the sales unit 18,20 was sold and the point of sale location where the sales unit 18,20 was sold. Alternately, purchaser information 40 may, for example, take the form of closed circuit video surveillance or the like. Thus, if it was determined that a postage stamp 10 sold at a particular location at a particular time on a particular date was involved in a crime, this information can be synchronized with video recordings (preferably maintained at the local point of sale rather than being transmitted to central computer 36 for ease of storage) to provide a picture of the purchaser.

Figure 6:
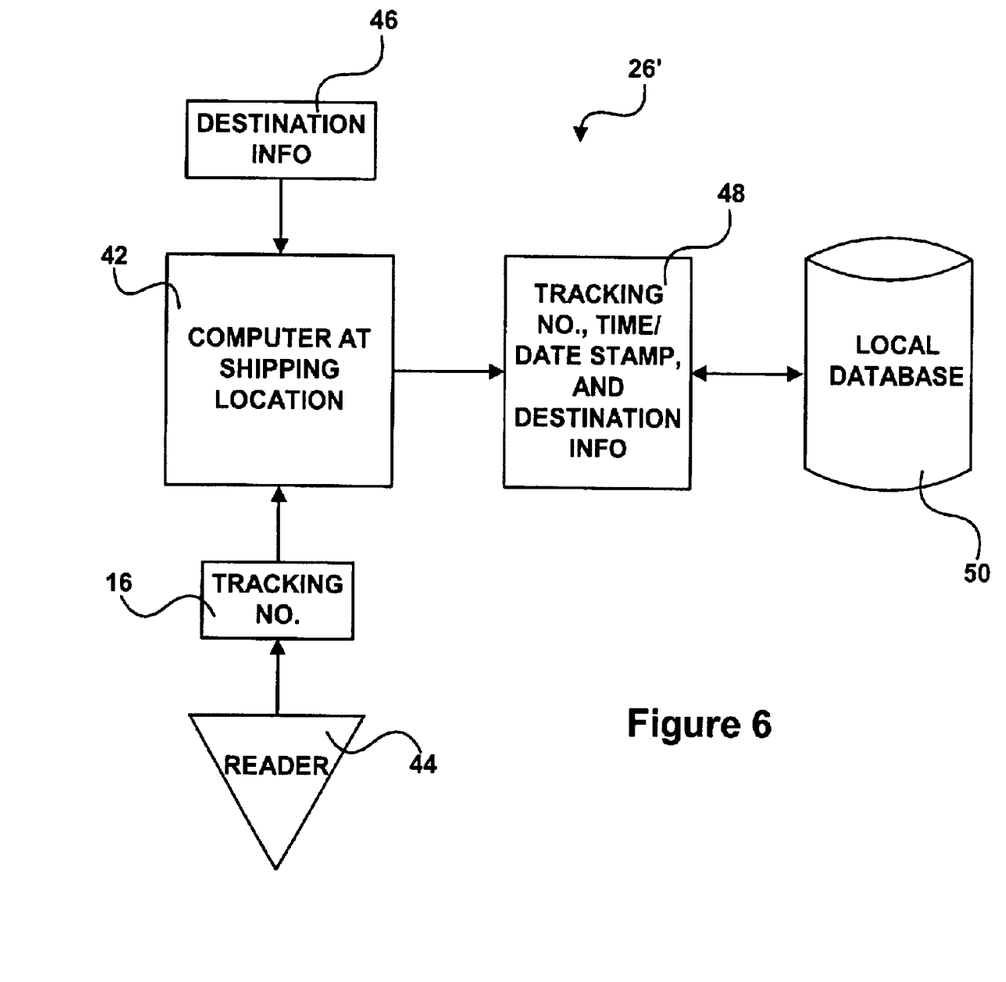
FIG. 6 is a schematic view illustrating another embodiment of a distribution based system for tracking postage in accordance with the present invention.

Referring now to FIG. 6, another embodiment of a distribution based system 26' for tracking postage in accordance with the present invention is shown. As will be understood from the below description, although system 26' may be used with any type of distribution unit 18,20,22, it is particularly well suited for use with shipping units, such as cartons 22 of stamps. Under system 26', a computer 42 is provided at each shipping location of postage stamps 10 in the chain until postage stamps 10 reach the retailer or vending company. Connected to computer 42 is a machine reader 44 for reading machine readable identification 24 on each shipping unit (i.e., carton 22 of stamps) as they are shipped or transshipped.

In accordance with the present invention, cartons 22 of stamps leaving the stamp printer would be provided with a unique identity as defined by their carton number. Each postage stamp 10 would be numbered with a tracking number 16, and that tracking number 16 would be the carton 22 number. In addition each sub-packaging element, such as a tray of 50 coils or a brick of 100 booklets, would be labeled with a machine readable identifier corresponding to its shipping carton. Therefore, for example, in carton number 11,318 each stamp and each tray or brick would bear the same tracking number 16.

As shipping unit 22 is shipped, the tracking number 16 of the postage stamps 10 making up shipping unit 22 is read by machine reader 44 from shipping unit 22 and communicated to computer 42. The read tracking number 16 is then supplemented with information concerning the time and date the shipping unit 22 was shipped and with information 46 concerning the destination to where the shipping unit 22 was shipped, and this combined information 48 is stored on a local database 50. Alternately, the combined information could be transmitted via a communication link to a central computer which stores this information on a central database (as discussed above in connection with the embodiment shown in FIG. 5).

Using the carton number as the traceable unit dramatically reduces the complexity of tracking stamps, because, among other reasons, the number of units to track are by comparison so small. Using this system, information about a stamp's point of sale may be derived for an order of 3 billion stamps by maintaining a database of only 37,500 carton numbers using an alphanumeric code. The tracking number 16 on each stamp would only have to be 4 digits.

Shipments of stamps would be made with a record of the destination of each numbered carton, and records of individual carton numbers would be maintained in a database at the stamp printer. The stamp printer may ship directly to post offices (typically in the case of larger post offices) or may ship to distribution facilities which may in turn transship to retail outlets and/or smaller post offices. If stamps are subsequently transshipped from a distribution facility to smaller post offices or retail establishments, this is the only point at which any active intervention need occur. Using this system, the USPS would know that a stamp, which was used for criminal purposes, arrived in a narrowly defined locale (e.g., a county, a city, or even a specific post office) on a certain date.

Such a system requires minimal investment by the USPS and requires very little involvement by the USPS until an investigation begins. It is simple yet very powerful, as it would provide a field inspector with the ability to know what post office, retailer or vending company sold the stamps or envelopes and the period of time in which they were sold. It is possible, if there were video surveillance already in place at the point of sale, that a criminal who uses the mail to facilitate the crime would also be on a video file.

It is possible, however, to implement a system with less than 200 machine readers, which would provide even more detailed information. If each distribution facility had a machine reader that was used only when cartons or partial cartons were transshipped locally, the identity of stamps going to a local post office, retailer or vending company would be known, as well as the date the stamps were transshipped. The machine readable identifiers on cartons being transshipped within the USPS distribution network would be read, or the sub package would be read if partial cartons were transshipped. Depending on the receiving and inventory procedures of the local post office or retailer, it is possible to substantially narrow the window of time during which a stamp was sold. If a record were kept locally as to the date and/or time a given carton was opened, the sale may be known to have occurred from a matter of hours in a busy post office to a matter of days in a smaller post office.

Machine reading at the distribution facility is simple and inexpensive. Smart machine readers, which are commercially available, would either be networked to a USPS file server to track these transshipments or the onus could be strictly on the stamp printer. If stamp printers were to have complete responsibility for each of their stamps, the smart machine readers could discern which stamp manufacturer's stamp was being transshipped by its machine readable identifier and communicate this information through a network to the stamp printer's server. Either way, a record of the point of sale of each stamp would exist.

Figure 7:
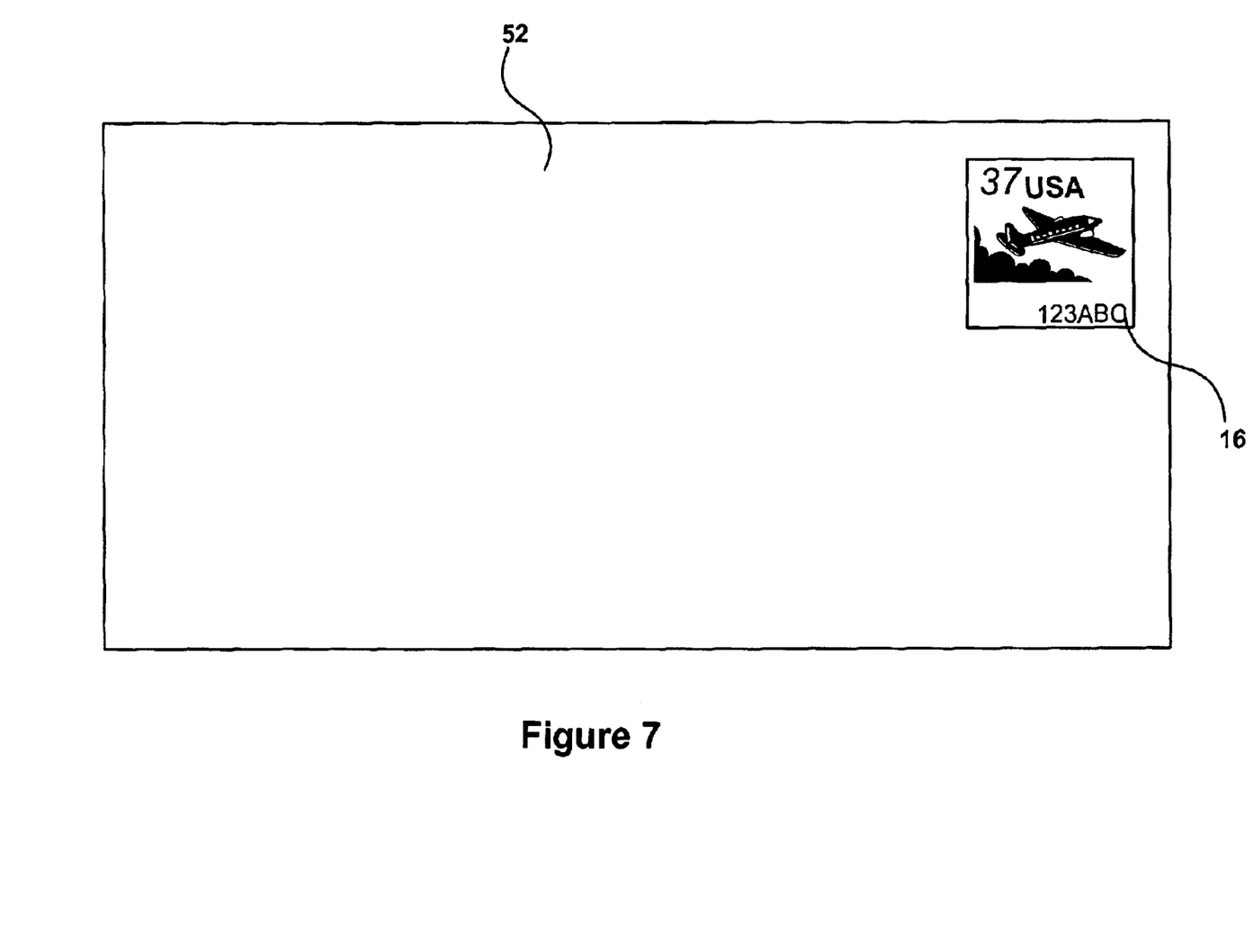
FIG. 7 is a front plan view of a preprinted envelope for use with a distribution based system for tracking postage in accordance with the present invention.

Referring now to FIG. 7, it should be understood that a tracking system 26,26' in accordance with the present invention is applicable for preprinted stamped envelopes 52 as well postage stamps 10. Each envelope 52 would also be imprinted with a tracking number 16. That tracking number 16 would be the same for all envelopes 52 in a carton 22. Each carton 22 would have a unique identifying number. Cartons and sub-packages could be tracked to the point of sale as described above in connection with postage stamps 10.

In the unfortunate event of criminal activity in the mail, a great deal of timely information is available to an inspector. Having identified the stamp or stamped envelope identifying number, the inspector merely checks a centralized database or contacts the stamp manufacturer. Within hours if not minutes, the Postal Service will know which post office, retailer or vending company sold the stamps or preprinted envelope. Furthermore, the inspector will know when the stamp was sold from a matter of hours to a matter of days. Coupled with cancellation and other information currently available to the USPS, a tracking system 26,26' in accordance with the present invention can be a very significant investigative tool.

Moreover, it should be recognized that there are other significant benefits which result from system 26,26'. Imprinting stamps with valid carton numbers is also a form of authentication, and can be a very powerful counterfeit deterrent. The mere presence of a serialized identity, which may invisible except under "black light" in the case that overt tracking numbers 16 are used, is a major security feature in itself. The ability to know that a stamp with a specific number on it should only be for sale at a particular location should be of tremendous help to the Inspection Service. Furthermore, stolen stamps are traceable. The presence of identification numbers on stamps render them much more difficult to sell in any kind of after market without detection.

In addition, a batch numbering system could be a major enhancement to a stamp printer's quality system. This system would be extremely helpful in zeroing in on defects and what is hopefully a very small population of stamps that may be similarity defective. Most defects such as print or die cutting misregistration, missing print or die cuts, or other process related flaws affect groups of stamps. Should a defect be found, the affected carton and those sequentially neighboring it may easily be identified and quarantined.

The present invention, therefore, provides a distribution based system for tracking postage which can be used to determine the location and approximate time of purchase of such postage, which is relatively simple to implement, which does not significantly increase the cost of manufacturing such postage, and which can be implemented with the current system of using stamps and preprinted envelopes.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A distribution based system for tracking postage comprising:
    a distribution unit comprising a plurality of postage items, each of the postage items comprising said distribution unit having a tracking number printed thereon, said distribution unit comprising a machine readable tracking identifier indicative of the tracking number printed on the postage items comprising said distribution unit;
    a machine reader for reading the machine readable tracking identifier as said distribution unit is distributed and for determining the tracking number therefrom; and
    a computer system having a memory associated therewith, said computer system receiving the tracking number from said machine reader and storing in the memory the tracking number along with a time and date the distribution unit was distributed.

2. The system of claim 1 wherein said machine readable tracking identifier comprises a bar code.

3. The system of claim 1 wherein the memory comprises a database.

4. The system of claim 1 wherein said postage items comprise postage stamps.

5. The system of claim 1 wherein said postage items comprise preprinted envelopes.

6. The system of claim 1 wherein the tracking number printed on the postage items is printed overtly with visible ink.

7. The system of claim 1 wherein the tracking number printed on the postage items is printed covertly with invisible ink with an ultra violet tracer.

8. The system of claim 1 wherein said distribution unit comprises a sales unit.

9. The system of claim 8 wherein the sales unit comprises a coil of postage stamps.

10. The system of claim 8 wherein the sales unit comprises a booklet or pane of postage stamps.

11. The system of claim 8:
    wherein said computer system comprises a local computer located at a point of sale of the sales unit, a central computer, and a central database accessible by the central computer;
    wherein the local computer receives the tracking number from said machine reader and transmits to the central computer via a communications link the tracking number along with the time and date the sales unit was sold; and
    wherein the central computer stores in the database the tracking number along with the time and date the sales unit was sold.

12. The system of claim 11:
    wherein the local computer receives purchaser information about a purchaser of the sales unit, and transmits to the central computer the purchaser information with the tracking number and the time and date the sales unit was sold; and
    wherein the central computer stores in the database the purchaser information along with the tracking number and the time and date the sales unit was sold.

13. The system of claim 1 wherein said distribution unit comprises a shipping unit.

14. The system of claim 13 wherein the shipping unit comprises a carton of postage items.

15. The system of claim 13:
   wherein said computer system comprises a local computer located at a shipping location from which the shipping unit is shipped and a database accessible by the local computer;
   wherein the local computer receives information about a destination of the shipping unit, receives the tracking number from said machine reader and stores in the database the tracking number along with the time and date the shipping unit was shipped and the destination of the shipping unit.

16. A distribution based method for tracking postage comprising the steps of:
   printing a tracking number on a plurality of postage items;
   grouping the postage items into a distribution unit;
   providing the distribution unit with a machine readable tracking identifier indicative of the tracking number printed on the postage items comprising the distribution unit;
   reading the machine readable tracking identifier as the distribution unit is distributed and determining the tracking number therefrom; and
   storing in a memory the tracking number along with a time and date the distribution unit was distributed.

17. The method of claim 16 wherein said providing step comprises the step of printing on the distribution unit a barcode comprising a machine readable tracking identifier indicative of the tracking number printed on the postage items comprising the distribution unit.

18. The method of claim 16 wherein the distribution unit comprises a sales unit and wherein said storing step comprises the steps of:
   receiving with a local computer the tracking number from the machine reader;
   transmitting from the local computer to a central computer via a communications link the tracking number along with the time and date the sales unit was sold; and
   storing in a database the tracking number along with the time and date the sales unit was sold.

19. The method of claim 18 wherein said storing step further comprises the step of receiving with the local computer purchaser information about a purchaser of the sales unit, and wherein the purchaser information is transmitted from the local computer to the central computer and stored on the database with the tracking number and the time and date the sales unit was sold.

20. The method of claim 16 wherein the distribution unit comprises a shipping unit and wherein said storing step comprises the steps of:
   receiving with a local computer located at a shipping location from which the shipping unit is shipped the tracking number from the machine reader;
   receiving with the local computer information about a destination of the shipping unit; and
   storing in a database the tracking number along with the time and date the shipping unit was shipped and the destination of the shipping unit.

21. A distribution based system for tracking postage comprising:
   a distribution unit comprising a plurality of postage items, each of the postage items comprising said distribution unit having a tracking number printed thereon, said distribution unit comprising a machine readable tracking identifier indicative of the tracking number printed on the postage items comprising said distribution unit; and
   wherein the tracking numbers printed on each of the postage items comprising said distribution unit are identical.

22. The system of claim 21 wherein said machine readable tracking identifier comprises a bar code.

23. The system of claim 21 wherein said postage items comprise postage stamps.

24. The system of claim 21 wherein said postage items comprise preprinted envelopes.

25. The system of claim 21 wherein the tracking number printed on the postage items is printed overtly with visible ink.

26. The system of claim 21 wherein the tracking number printed on the postage items is printed covertly with invisible ink with an ultra violet tracer.

27. The system of claim 21 wherein said distribution unit comprises a sales unit.

28. The system of claim 27 wherein the sales unit comprises a coil of postage stamps.

29. The system of claim 27 wherein the sales unit comprises a booklet or pane of postage stamps.

30. The system of claim 21 wherein said distribution unit comprises a shipping unit.

31. The system of claim 30 wherein the shipping unit comprises a carton of postage items.

32. A distribution based method for tracking postage comprising the steps of:
   printing an identical tracking number on a plurality of postage items;
   grouping the postage items into a distribution unit;
   providing the distribution unit with a machine readable tracking identifier indicative of the tracking number printed on the postage items comprising the distribution unit.

33. The method of claim 32 wherein said providing step comprises the step of printing on the distribution unit a barcode comprising a machine readable tracking identifier indicative of the tracking number printed on the postage items comprising the distribution unit.

* * * * *